United States Patent [19]

Ukai et al.

[11] Patent Number: 4,730,834
[45] Date of Patent: Mar. 15, 1988

[54] MECHANICAL SHAFT JOINT BOOT

[75] Inventors: Mikio Ukai, Nagoay; Kenji Miyamoto, Inazawa, both of Japan

[73] Assignee: Toyoda Gosei Co., Ltd., Japan

[21] Appl. No.: 853,760

[22] Filed: Apr. 18, 1986

[30] Foreign Application Priority Data

Apr. 19, 1985 [JP] Japan ................ 60-085246

[51] Int. Cl.$^4$ ............... F16J 3/04; F16J 15/52
[52] U.S. Cl. ............... 277/212 FB; 74/18.2; 403/50
[58] Field of Search ............ 277/30, 31, 33, 212 R, 277/212 FB; 74/18, 18.1, 18.2; 403/50, 51

[56] References Cited

U.S. PATENT DOCUMENTS

| 3,704,894 | 12/1972 | Didzuhn | 277/212 FB |
| 3,995,502 | 12/1976 | Jones | 74/18.2 |
| 4,224,808 | 9/1980 | Jehrke | 277/212 FB X |
| 4,278,262 | 7/1981 | Mizutani et al. | 277/212 FB |

FOREIGN PATENT DOCUMENTS

| 1525900 | 9/1969 | Fed. Rep. of Germany | 277/212 FB |
| 2902455 | 7/1980 | Fed. Rep. of Germany | 277/212 FB |

Primary Examiner—Robert S. Ward

[57] ABSTRACT

A mechanical shaft joint boot made of a resin comprises a bellows having four to seven crests between a large-diameter ring and a small-diameter ring, in which a crest excluding the first crest between the large-diameter ring and the center of the bellows has the maximum top curvature radius. By providing this structure, the thicknesses of these crests are made uniform and elongation-compression distortion is restrained from being concentrated at their tops. The widening of the tops of the crests also restrains any kinking phenomenon which may be produced. Therefore, the durability of the tops of these crests is increased and the durability of the boot as a whole is hence also increased.

13 Claims, 5 Drawing Figures

MECHANICAL SHAFT JOINT BOOT

BACKGROUND OF THE INVENTION

The present invention relates to a mechanical shaft joint boot made of a resin comprising a bellows having four to seven crests between a large-diameter ring and a small-diameter ring (hereinafter called "boot"), and particularly relates to a boot suitable for a shaft joint of a constant velocity type for an automobile.

In this specification, the crests are numbered first, second, ... in order from the large-diameter ring of the bellows, the troughs are numbered in the same order as the crests, and the radius of curvature ($R_i$) shows an external curvature of the top of a crest i.

In general, a boot made of a resin having a bellows of the above-described type has conventionally been so formed that the radius, of curvature of all the crests are identical, as shown in FIG. 1 (a five-crest type). Such a boot has conventionally been formed by blow molding and thus the thicknesses of the material at the crests and at the troughs have not been uniform, the material at the crests (particularly their tops) being thinner than at the troughs (refer to the black circles shown in FIG. 5).

It is estimated from the results of various investigations conducted by the inventors that this is due to the duplication of one or more of the causes described below.

(a) Since the thickness is rapidly reduced from the trough to the top of the crest, the distortion of elongation and compression is concentrated at the top.

(b) The elongation distortion is particularly concentrated at the crest which lies at the center of the bellows or at crests lying between the large-diameter ring and the center (the second and third crests in the boot shown in FIG. 1) (the cause is not known, refer to "the X-ray fluoroscopic view showing the state of a boot during a crossing movement" in FIG. 2).

(c) A bending (kinking) phenomenon is produced at the central crest of the bellows or at a crest lying between the large-diameter ring and the center (FIG. 3). It can be conjectured that the production of this kinking phenomenon is caused by the rapid change in compression and elongation which is attributed to the poor movement of the greatly enlarged crest toward the compressed side.

SUMMARY OF THE INVENTION

The boot of the present invention is so formed that the radius of curvature of the tops of the crests (excluding the first crest) between the large-diameter ring and the center of the bellows where the elongation-compression distortion is most concentrated during the crossing movement of a mechanical shaf.

By providing the above-described structure, it is a first object of the present invention to provide a boot in which the difference in the thickness of the material between the top of a crest and the inclined surface adjacent to it is reduced, this being the region where the elongation-compression distortion is concentrated. Such a reduction restrains the tendency for the elongation-compression distortion to occur at this crest.

It is a second object of the present invention to provide a boot in which the elongation-compression distortion is dispersed to the crests lying between the small-diameter ring and the center of the bellows (where there is less concentration of the elongation-compression distortion) which crests have a relatively small top radius of curvature (a large difference in the thickness of the material between the top and the inclined surface), and thus it is made difficult for the elongation-compression distortion to be concentrated at the crests between the large-diameter ring and the center.

It is a third object of the present invention, with respect to the kinking problem, to provide a boot in which the thickness of the material at the tops of the crests between the large-diameter ring and the center of the bellows can be increased and in which the width at the tops can also be increased, shape retention at the top thereby being increased and the tendency for kinking to occur at these crests being curbed.

It is another object of the present invention to provide a boot in which the durability of these crests is increased by preventing the concentration of elongation-compression distortion and the production of the kinking phenomenon at the crests between the large-diameter ring and the center of the bellows, durability of the whole boot thereby being increased.

DESCRIPTION OF THE PREFERRED EMBODIMENT

Figure 1:
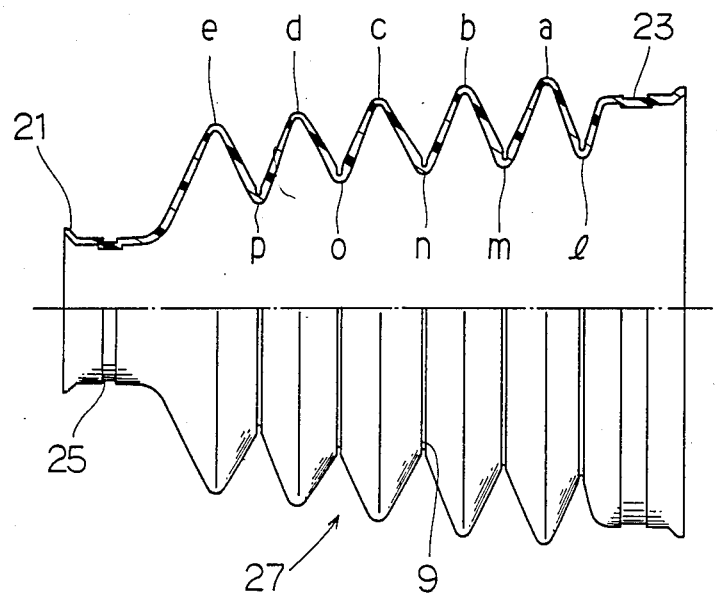
FIG. 1 is a half sectional view showing a conventional boot.
Figure 3:
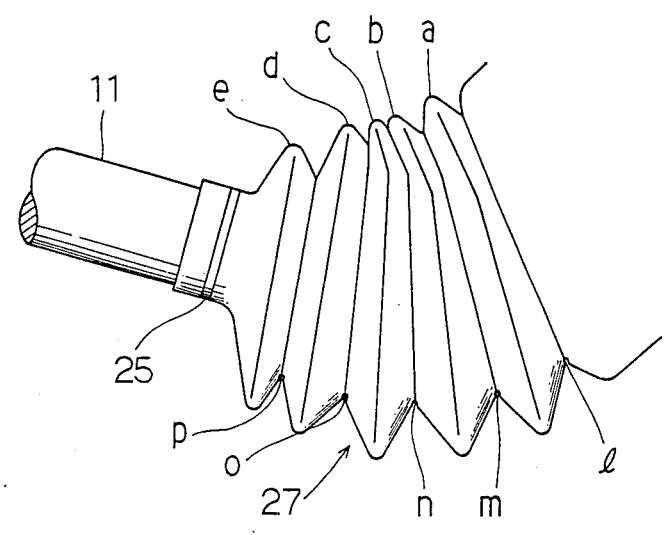
FIG. 3 is a side plan view showing the kinking state during the crossing movement of the boot shown in FIG. 1.
Figure 2:
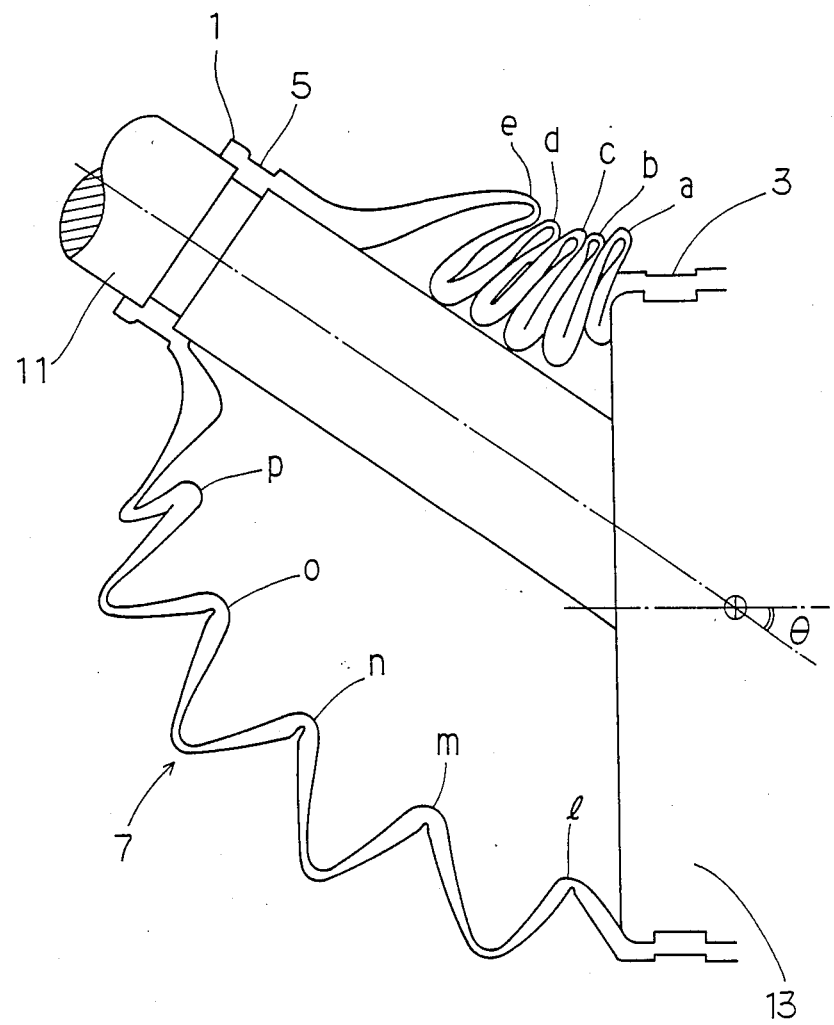
FIG. 2 is an X-ray fluoroscopic view showing the enlarged-compressed state during the crossing movement of the boot shown in FIG. 1.
Figure 4:
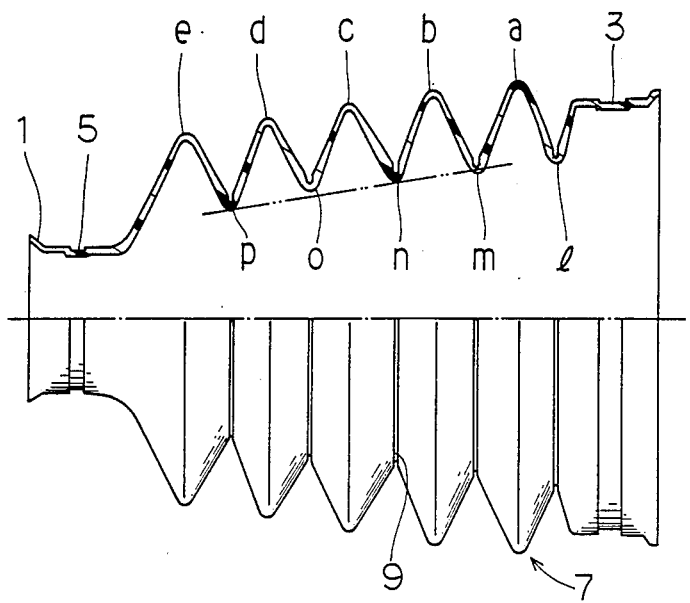
FIG. 4 is a half sectional view showing an embodiment of a boot of the present invention.

FIG. 4 is a half sectional view showing an embodiment of a boot 1 of the present invention in which the first crest a, the second crest b, and the third crest c have different radius of curvature at their tops as compared with those of the conventional boot (FIG. 1) and which is formed using a polyester TPE material by injection blow molding. More specifically, the boot 1 of the present invention comprises a bellows 7 provided between a large-diameter ring 3 and a small-diameter ring 5, in which the bellows is a five-crest type,
the top curvature radius of the crests are as follows:
the second crest b=3 mm
the first crest a=the third crest c=2 mm
the fourth crest d=the fifth crest e=1.5 mm, and a cut groove 9 is circumferentially formed around the circumference of each trough on the external surface for the purpose of dispersing distortion. Furthermore, the fourth trough o is located above an imaginary line connecting the third trough n and the fifth trough p whereby interference with a driving shaft is avoided and whirling is minimized.

Figure 5:
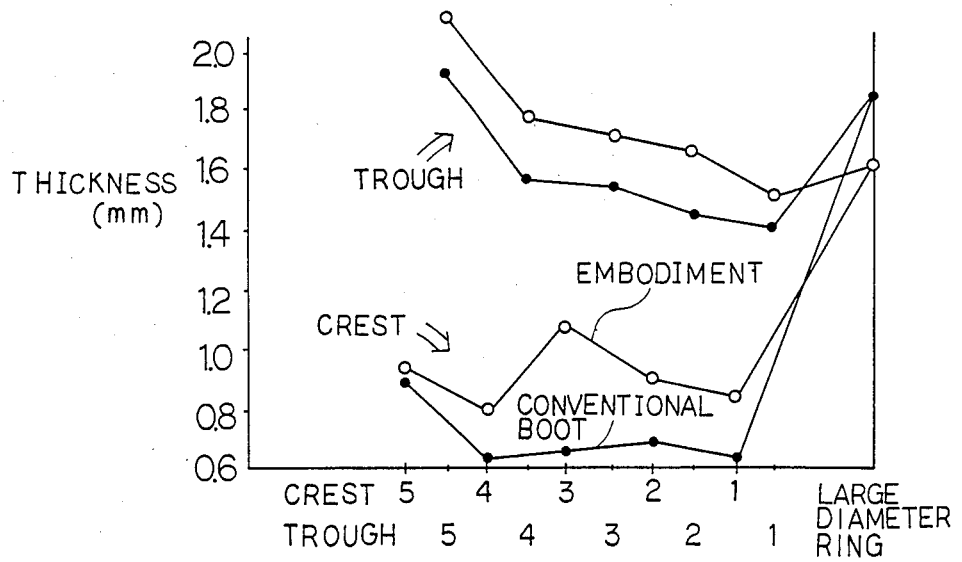
FIG. 5 is a graph showing the thicknesses of the crests and the troughs of the boot shown in FIG. 4 (white circles) and the boot shown FIG. 1 (black circles).

Next, the thicknesses of the material at the crests (the thickness at the top) and at the troughs (the thickness from the cut groove 9) of the boot 1 of this embodiment will be compared with those of the conventional boot (FIG. 1) (FIG. 5). In FIG. 5, the while circles indicate this embodiment, while the black circles indicate the conventional boot which is formed using a polyester TPE material by injection blow molding as in the embodiment and is different from the embodiment only in the point that the top curvature radius of all its crests is 1.5 mm.

Table 1 shows a comparison between the ratios of the thicknesses of the material at the troughs to that at the crests in the embodiment and the ratios of the conventional boot (the ratio of the thickness at the groove portion of the first trough l to that at the top of the first crest a, the ratio of the thickness at the groove portion of the second trough m to that at the top of the second crest b, ...).

TABLE 1

| trough | 5 | 4 | 3 | 2 | 1 |
|---|---|---|---|---|---|
| crest | 5 | 4 | 3 | 2 | 1 |
| Embodiment | 2.75 | 2.20 | 1.55 | 1.80 | 1.76 |
| Conventional boot | 2.18 | 2.42 | 2.43 | 2.00 | 2.10 |

It will be seen from this table that this embodiment has uniform thicknesses of the material between the large-diameter ring 6 and the center of the bellows 7, as compared with the conventional boot. It is thought that this may be attributed to the increased top curvature radius at this end of the bellows and the facilitation of flowing of the material into the crest during the blow molding.

On the other hand, the results of the tests conducted for the purpose of examining the kinking phenomenon of the boot 1 of this embodiment and the conventional boot are shown in Table 2, in which the rate of rotation is 300 rpm, the atmospheric temperature is 100° C. and the material is polyester TPE.

TABLE 2

| | Maximum crossing angle θ | Results |
|---|---|---|
| Embodiment | 39° | Damage at the third trough after 20–36 hr. |
| Conventional boot | 35° | Kinking and damage at all the crests after 2.5 hr. |

When the above-described test was carried out continuously on the embodiment, damage was produced at the third trough after 20 to 36 hours. This shows that the durability of the boot 1 of this embodiment depends upon the durability of the troughs. It is thought that this is caused by the combination of the uniformity of the above-described thickness and the absence of the kinking phenomenon. In this way, the thickness of the trough is larger than that of the crest and the elongation-compression distortion is small during the crossing movement (because the radius distance from the driving shaft is small compared with the crests), the durability of the whole boot thus being improved as compared with the conventional boot.

As described above, the boot 1 having the bellows 7 of the five-crest type is shown as an embodiment, but all boots of the types shown in Table 3 described below exhibit the same results as the five-crest type.

Table 3 shows combinations of the curvature radius at the tops suitable for achieving the objects of the present invention by using equality signs and inequality signs.

The relationship between the curvature radius of the first crest and that of the crests between the small-diameter ring and the crest having the maximum curvature radius is a design factor to be determined by those skilled in the art, the top of each crest being so formed that the elongation-compression distortion is dispersed as much as possible.

$R_1$ is not the maximum radius of the crest because the enlarged quality of the first crest a is smaller than those of the second crest b and the third crest c and the the propensity for the kinking phenomenon to be produced at the first crest a is curbed.

TABLE 3

| | $R_1$ | $R_2$ | $R_3$ | $R_4$ | $R_5$ | $R_6$ | $R_7$ |
|---|---|---|---|---|---|---|---|
| Four-crest type | < | > | ≧ | | | | |
| Five-crest type | < | > | ≧ | ≧ | | | |
| " | ≦ | < | > | ≧ | | | |
| " | < | = | > | ≧ | | | |
| Six-crest type | < | > | ≧ | ≧ | ≧ | | |
| " | ≦ | < | > | ≧ | ≧ | | |
| " | < | = | > | ≧ | ≧ | | |
| Seven-crest type | < | > | ≧ | ≧ | ≧ | ≧ | |
| " | < | = | > | ≧ | ≧ | ≧ | |
| " | < | = | = | > | ≧ | ≧ | |
| " | ≦ | < | > | ≧ | ≧ | ≧ | |
| " | ≦ | < | = | > | ≧ | ≧ | |
| " | ≦ | ≦ | < | > | ≧ | ≧ | |

What is claimed is:

1. A mechanical shaft joint boot made of a resin formed by blow molding, which comprises:
   (a) a large-diameter ring;
   (b) a small-diameter ring; and
   (c) a bellows formed between said large-diameter ring and said said small-diameter ring,
   said bellows being connected to said small-diameter ring through said large-diameter ring, each crest i having a radius of curvature at the top $R_i$ (i=1, 2, ... n; 4≦n≦7) in order and said bellows having at least one crest k in said crests i which satisfy the factor given below:

$$R_1 > R_k > R_{jmax}$$

wherein k satisfies $2 \leq k \leq n + \frac{1}{2}$ and $R_{jmax}$ is the maximum value of $R_j$ satisfying $n + \frac{1}{2} < j$.

2. A mechanical shaft joint boot according to claim 1, wherein the top curvature radius of the crests between the smaller-diameter ring and the crest k having the maximum top curvature radius is gradually decreased toward the small-diameter ring.

3. A mechanical shaft joint boot according to claim 1, wherein the top curvature radius of all the crests between the small-diameter ring and the crest k having the maximum top curvature radius are identical.

4. A mechanical shaft joint boot according to claim 1, wherein the top curvature radius of the crests between said small-diameter ring and said crest k having the maximum top curvature radius are partially identical and the top curvature radius of the remainder of the crests between said small-diameter ring and said crest k are gradually decreased toward the small-diameter ring.

5. A mechanical shaft joint boot according to one of claims 2 to 4, wherein, if said crest k having the maximum top curvature radius is the third crest and/or the fourth crest, the top curvature radius of the crests between the large-diameter ring and the crest k are gradually decreased toward the large-diameter ring.

6. A mechanical shaft joint boot according to claim 3, wherein, if said crest k having the maximum top curvature radius is the third crest and/or the fourth crest, the top curvature radius of the crests between the large-diameter ring and the crest k are gradually decreased toward the large-diameter ring.

7. A mechanical shaft joint boot according to claim 4, wherein, if said crest k having the maximum top curvature radius is the third crest and/or the fourth crest, the top curvature radius of the crests between the large-diameter ring and the crest k are gradually decreased toward the large-diameter ring.

8. A mechanical shaft joint boot according to one of claims 2 to 4, wherein, if said crest k having the maximum top curvature radius is the third crest and/or the fourth crest, the top curvature radius of all the crests between said large-diameter ring and said crest k are identical.

9. A mechanical shaft joint boot according to claim 3, wherein, if said crest k having the maximum top curvature radius is the third crest and/or the fourth crest, the top curvature radius of all the crests between said large-diameter ring and said crest k are identical.

10. A mechanical shaft joint boot according to claim 4, wherein, if said crest k having the maximum top curvature radius is the third crest and/or the fourth crest, the top curvature radius of all the crests between said large-diameter ring and said crest k are identical.

11. A mechanical shaft joint boot according to one of claims 2 to 4, wherein, if said crest k having the maximum top curvature radius is the fourth crest, the top curvature radius of the crests between said large-diameter ring and said crest k are partially identical and the top curvature radius of the remaining crests are gradually decreased toward the large-diameter ring.

12. A mechanical shaft joint boot according to claim 3, wherein, if said crest k having the maximum top curvature radius is the fourth crest, the top curvature radius of the crests between said large-diameter ring and said crest k are partially identical and the top curvature radius of the remaining crests are gradually decreased toward the large-diameter ring.

13. A mechanical shaft joint boot according to claim 4, wherein, if said crest k having the maximum top curvature radius is the fourth crest, the top curvature radius of the crests between said large-diameter ring and said crest k are partially identical and the top curvature radius of the remaining crests are gradually decreased toward the large-diameter ring.

* * * * *

UNITED STATES PATENT OFFICE
CERTIFICATE OF CORRECTION

Patent No. 4,730,834          Dated March 15, 1988

Inventor(s) Mikio UKAI et al

It is certified that error appears in the above-identified patent and that said Letters Patent are hereby corrected as shown below:

Column 4, line 38, the expression which reads:

"$R_1 > R_k > R_{jmax}$"

should read:

--$R_1 < R_k > R_{jmax}$--;

line 40,

"$R_{jimax}$"

should read:

--$R_{jmax}$--;

and "$n + \frac{1}{2}$" should read --$(n+1)/2$--;

UNITED STATES PATENT AND TRADEMARK OFFICE
CERTIFICATE OF CORRECTION

PATENT NO. : 4,730,834
DATED : March 15, 1988
INVENTOR(S) : Mikio Ukai et al

It is certified that error appears in the above-identified patent and that said Letters Patent is hereby corrected as shown below:

Column 4, line 41, "$n+\frac{1}{2}<j$" should read --$(n+1)/2<j$--.

Signed and Sealed this

Twentieth Day of December, 1988

*Attest:*

DONALD J. QUIGG

*Attesting Officer*   *Commissioner of Patents and Trademarks*